United States Patent [19]

Perkins

[11] 4,120,506
[45] Oct. 17, 1978

[54] WELLHEAD SEAL

[75] Inventor: Thomas K. Perkins, Dallas, Tex.

[73] Assignee: Atlantic Richfield Company, Los Angeles, Calif.

[21] Appl. No.: 863,005

[22] Filed: Dec. 21, 1977

[51] Int. Cl.² .............................................. F16J 15/20
[52] U.S. Cl. .................... 277/105; 277/188 R; 277/208; 277/215; 166/75 R
[58] Field of Search ................ 277/105, 106, 123–125, 277/188 R, 188 A, 189, 198, 208–210, 215; 166/75 R

[56] References Cited

U.S. PATENT DOCUMENTS

| 2,239,641 | 4/1941 | Bierend | 277/209 |
| 3,090,438 | 5/1963 | Raulins | 166/75 R |
| 3,163,223 | 12/1964 | Bauer et al. | 166/75 R X |
| 3,909,019 | 9/1975 | Leko | 277/209 |

FOREIGN PATENT DOCUMENTS 1,774 of 1892 United Kingdom ...................... 277/105

Primary Examiner—Robert S. Ward, Jr.
Attorney, Agent, or Firm—Roderick W. MacDonald

[57] ABSTRACT

In a wellhead for wells such as an oil and/or gas well wherein an elastic annular seal means is employed in the wellhead for sealing the interior thereof from the exterior thereof, the improvement comprising at least one annular resilient back-up means for said seal means, the back-up means comprising a stack of at least two annular resilient members, each member having a plurality of spaced apart protrusions thereon and each member being oriented in relation to its next adjacent member so that the protrusions of each member in the stack abut the adjacent member in between the protrusions of that adjacent member.

5 Claims, 6 Drawing Figures

WELLHEAD SEAL

BACKGROUND OF THE INVENTION

Heretofore in sealing two separate pieces of a wellhead that are fixed together, an annular rubber seal means has been placed between portions of the two pieces of wellhead and then subjected to compression forces between the two pieces of wellhead so that the elastic seal means expands into sealing engagement with both pieces of wellhead.

Normally the wellhead is put together and the seal means compressed at a given temperature. Thereafter the wellhead is put into operation, at which time the temperature of the seal means often increases. This increase in operating temperature helps the efficiency of the seal means. However, should the well be shut in and production stopped, the temperature of the seal means can drop below the initial makeup temperature at which the wellhead was put together in the first place. This can have an adverse effect on the seal means since it tends to contract on cooling, particularly if the wellhead is emplaced in a far North location such as the Arctic or similar locations. When the seal means is cooled substantially below the initial wellhead makeup temperature, the seal can release in some situations thereby allowing leaks from the interior of the wellhead to its exterior.

SUMMARY OF THE INVENTION

According to this invention there is emplaced adjacent the seal means at least one resilient back-up means which will yield under the initial makeup pressure of the wellhead and which will tend to push back against the resilient seal means even when the seal means is cooled substantially below its initial makeup temperature thereby maintaining a high compression pressure on the seal means at temperatures well below the initial makeup temperature of the wellhead.

The resilient back-up means of this invention for use adjacent the seal means comprises a stack of at least two annular resilient members coextensive with the annular seal means, each member having a plurality of spaced apart protrusions thereon and the members in the stack being oriented in relation to one another so that the protrusions of each member abut the adjacent member in between the protrusions of that adjacent member.

By the stack member arrangement of this invention the protrusion of one member, when subjected to compressive forces, causes some flexing of the next adjacent member since that protrusion is bearing between the protrusions of the next adjacent member. Thus, when the wellhead is cooled below its initial makeup temperature and the elastic seal means tends to shrink, the flexed back-up means will push against the shrinking seal means and thereby maintain a high compression force on the seal means and prevent a seal release.

Accordingly, it is an object of this invention to provide a new and improved wellhead seal means apparatus. It is another object to provide a new and improved wellhead construction for use under Arctic or similar conditions.

Other aspects, objects and advantages of this invention will be apparent to those skilled in the art from this disclosure and the appended claims.

DETAILED DESCRIPTION OF THE INVENTION

Figure 1:
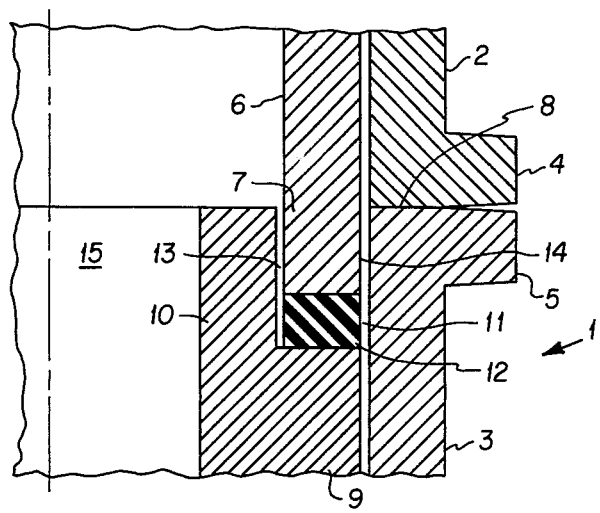
FIG. 1 shows a cross section of a wellhead with an annular seal means in place.

More specifically, FIG. 1 shows a portion of a wellhead 1 wherein upper and lower wellhead members 2 and 3, respectively, are to be joined together in a conventional manner such as by bolts (not shown) at flanges 4 and 5. Outer wellhead section 2 carries an inner piece 6 which is welded thereto and which has an extension 7 which extends below joint 8 formed by abutting flanges 4 and 5. Outer wellhead section 3 has an inner piece 9 welded thereto with an upper extension 10 which extends inside and overlapping with extension 7 thereby forming an annular opening 11 in which is emplaced a resilient, normally rubber, seal means 12.

Seal means 12 therefore provides a seal between joint 13 where members 10 and 7 overlap, joint 14 where member 7 and flange 5 overlap, and joint 8 so that fluid in the interior 15 of the wellhead cannot leak to the exterior of the wellhead by way of joints 13, 14 and 8.

Figure 2:
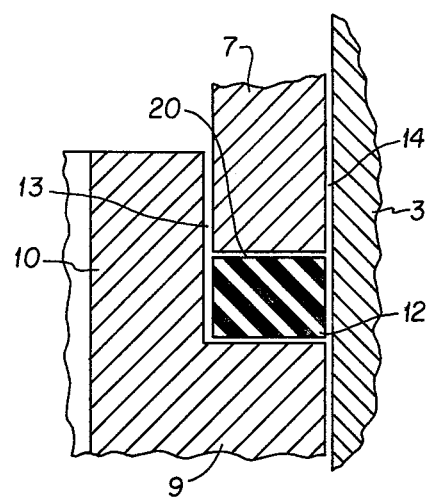
FIG. 2 is a larger view of the seal means of FIG. 1.

Referring now to FIG. 2, when the upper and lower wellhead sections 2 and 3 are made up, i.e., joined together and tightened down, members 7 and 9 are forced towards one another and put seal means 12 under compression at the initial makeup temperature of the wellhead, e.g., 20° F. Under compression, even with the use of conventional restraining rings and other devices, some of the elastic seal means tends to extrude into cracks such as joints 13 and 14. Thereafter, when warmer oil and/or gas or other fluids are produced through interior 15 of the wellhead, seal means 12 may be heated substantially above the initial 20° F. makeup temperature, e.g., to over 100° F., at which time the seal means tends to expand more and form an even tighter seal. However, should fluid not be produced through interior 15, i.e., the well is shut in, seal means 12 can be cooled substantially below its initial 20° F. makeup temperature, e.g., to minus 50° F. or lower in an Arctic location. When cooled substantially below its initial makeup temperature, seal means 12 tends to contract and can in some cases contract enough to pull away a slight bit from member 7 and/or member 9 thereby breaking the seal between joints 13 and 14 and allowing fluid to pass through joint 13 by, for example, a space 20 formed between contracting seal means 12 and member 7 and, ultimately, escape through joint 8 to the atmosphere.

Figure 3:
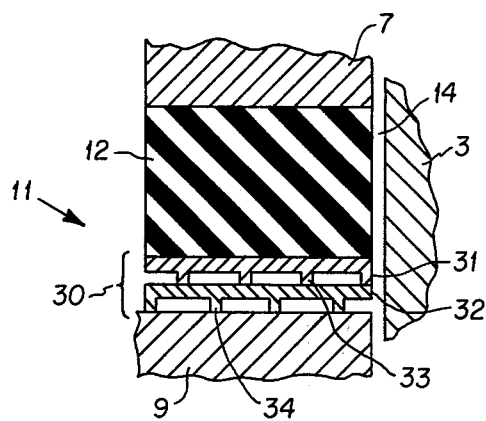
FIG. 3 shows a seal means such as that shown in FIGS. 1 and 2 but with the back-up means of this invention emplaced with the seal means.

To prevent cracks such as 20 from forming upon extreme cooling of seal means 12, this invention employs, as can be seen in FIG. 3, a resilient back-up means 30 which is disposed adjacent (above and/or below) seal means 12 in annular space 11 and which is composed of a stack of at least two annular resilient members.

In FIG. 3 two such members 31 and 32 are shown, although more than two members can be employed if desired. Each of members 31 and 32 are annular in configuration and coextensive with seal means 12 so that when seal means 12 is put under compressive stress upon makeup of the wellhead, members 31 and 32 are also subjected to such stress.

Each of members 31 and 32 have a plurality of spaced apart protrusions 33 and 34 extending downwardly therefrom. Members 31 and 31 are oriented in relation to one another so that protrusions 33 on member 31 abut adjacent member 32 in the space between protrusions 34 on member 32. This way, when seal means 12 is subjected to compressive stresses, those stresses are transmitted from member 31 to member 32 by way of protrusions 33 and, protrusions 33, being placed between protrusions 34, cause some flexing of member 32 between protrusions 34. This flexing is repeated a number of times around each member and gives a cumulative back-up resilience which comes into play when seal means 12 is cooled and contracts. Accordingly, when seal means 12 is cooled substantially below its wellhead makeup temperature and contracts, the flexed portions of members 31 and 32 continue to push against seal means 12 thereby preventing the formation of a space between seal means 12 and other parts of the wellhead. That is to say that space 20 of FIG. 2 does not form in the embodiment of FIG. 3 even upon substantial cooling of the wellhead.

Members 31 and 32 can be composed of any resilient metal or metal alloy such as nickel based alloys commercially sold, commercial copper-beryllium alloys, and the like. Desirale metallurgical properties for such members include a low modulus, high yield strength, ductility at low temperature and good resistance to chemical attack. The members can be one piece or segmented.

Figure 4:
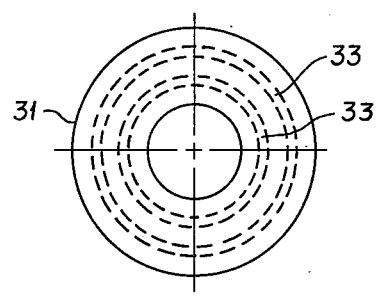
FIG. 4 shows one embodiment of the back-up means member in accordance with this invention.

FIG. 4 shows member 31 from an upper view, i.e., from the side on which seal means 12 residues in FIG. 3. FIG. 3 shows annular member 31 with protrusions 33 extending circumferentially around that member, the protrusions being spaced apart from one another radially across the lower face of the member.

Figure 5:
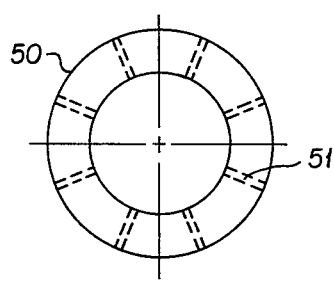
FIG. 5 shows another embodiment of a back-up means member in accordance with this invention.

FIG. 5 shows another embodiment for the members of the back-up means of this invention wherein annular member 50 has on the bottom surface thereof a plurality of protrusions which extend radially across the member (as opposed to circumferentially around the member in FIG. 4). Protrusions 51 are spaced apart circumferentially around the full circumference of member 50.

The members of this invention can have protrusions on one or both sides thereof, the invention being described with respect to protrusions on the bottom side thereof for simplicity sake only.

Figure 6:
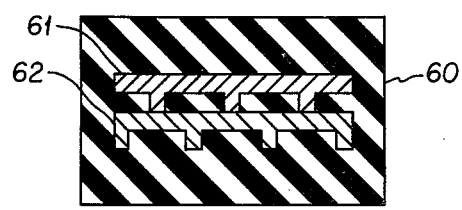
FIG. 6 shows a seal means — back-up means combination within this invention.

FIG. 6 shows an embodiment of this invention wherein the back-up means is incorporated in the interior of the seal means. FIG. 6 shows seal means 60 having a stack of back-up means members 61 and 62 (similar to those described in relation to FIG. 3) in the interior of seal means 60.

Reasonable variations and modifications are possible within the scope of this disclosure without departing from the spirit and scope of this invention.

The embodiments of the invention in which an exclusive property or privilege is claimed are defined as follows:

1. In a wellhead having an elastic annular seal means, the improvement comprising at least one annular resilient back-up means adjacent said seal means, said backup means comprising a stack of at least two annular resilient members, each member having a plurality of spaced apart protrusions thereon, said members being oriented in relation to one another so that the protrusions of each member abut the adjacent member in between the protrusions of that adjacent member.

2. The apparatus according to claim 1 wherein said back-up means is incorporated in the interior of said seal means.

3. The apparatus according to claim 1 wherein said protrusions extend radially across each member, said protrusions are spaced apart circumferentially, and said protrusions are employed around the full circumference of each member.

4. The apparatus according to claim 1 wherein said protrusions extend circumferentially around each member, said protrusions are spaced apart radially, and said protrusions are employed across at least one face of each member.

5. The apparatus according to claim 1 wherein said back-up means is emplaced adjacent at least one face of said seal means.

* * * * *